United States Patent [19]

Bartlett

[11] Patent Number: 4,823,453

[45] Date of Patent: Apr. 25, 1989

[54] COMBINATION FAUCET CARTRIDGE AND HANDLE PULLER

[76] Inventor: Joseph E. Bartlett, 235 S. Parker, Olathe, Kans. 66061

[21] Appl. No.: 103,711

[22] Filed: Oct. 2, 1987

[51] Int. Cl.[4] ............ B23P 19/04

[52] U.S. Cl. ............ 29/261

[58] Field of Search ............ 29/259–262

[56] References Cited

U.S. PATENT DOCUMENTS

| | | | |
|---|---|---|---|
| 186,229 | 1/1877 | Casterline | 29/261 |
| 2,870,530 | 1/1959 | Dvorak | 29/261 |
| 4,084,305 | 4/1978 | Chang | 29/261 |
| 4,123,838 | 11/1978 | Mayavero | 29/262 |

*Primary Examiner*—Robert C. Watson

*Attorney, Agent, or Firm*—Kokjer, Kirscher, Bradley, Wharton, Bowman & Johnson

[57] ABSTRACT

A tool for pulling faucet handles and flow control cartridges from a faucet housing. A pair of spaced apart jaws are pivotally coupled with a block. A bolt extends centrally through the block and a chuck on the end of the bolt is used for coupling either a shaft or a claw. When pulling a handle the shaft is coupled with the bolt and the jaws are coupled with the handle. Extension of the bolt exerts an upward force which results in removal of the handle. The claw may then be inserted into the chuck and coupled with the cartridge. Retraction of the bolt then exerts an upward force which causes removal of the cartridge.

7 Claims, 1 Drawing Sheet

COMBINATION FAUCET CARTRIDGE AND HANDLE PULLER

BACKGROUND OF THE INVENTION

This invention relates to plumbing repair and maintenance tools and more particularly to a tool which may be used to remove a faucet handle as well as a flow control cartridge housed within the faucet.

Conventional faucets typically employ either a drop-in or a screw-in flow control cartridge which is coupled with the faucet handle for regulating water flow. The drop-in cartridge is generally known as a washerless cartridge and is maintained in place within the faucet by a separate threaded retaining ring or cap nut which screws onto an externally threaded faucet housing. The screw-in cartridge is similar to the drop-in cartridge but is externally threaded and is coupled with an internally threaded faucet housing.

When a leak or other problem develops with a faucet, the faucet handle must be removed in order to provide access to the flow control cartridge. Removal of the handle can be extremely difficult to accomplish because corrosion and the deposit of minerals from the water tends to cement the handle to the stem to which it is attached. When this occurs, attempts to remove the handle by prying with a screwdriver or other implement nearly always results in damage to the faucet, the handle or the stem of the cartridge. These items must then be replaced at a significant expense to keep the fixture in use.

When a faucet develops a leak, the cartridge is typically removed and discarded during the repair procedure. The source of a leaking faucet can often be traced to the failure of one or more o-rings which are coupled with the cartridge for maintaining a water-tight seal within the faucet housing. These rings are a relative inexpensive item which are easily replaced and it is desirable that they be renewed rather than the entire cartridge replaced. However, a drop-in cartridge can be difficult to remove from its housing after is has been used over a period of time and removal usually damages the cartridge. The cartridge must then be discarded even though it might otherwise be reused by simply renewing the o-rings.

SUMMARY OF THE INVENTION

It is an object of this invention to provide a tool which may be used to remove a drop-in cartridge from a chamber within a faucet body without damaging the cartridge so that it may be reused after repairs to the faucet or renewal of cartridge elements have been effected.

It is also an object of this invention to provide a tool which may be used to remove a drop-in cartridge from a chamber within a faucet body in a manner which does not result in damage to the exterior finish or surface of the faucet.

It is another object of this invention to provide a tool which may be used for removal of a faucet handle without damaging the faucet body, handle or the cartridge.

It is a further object of this invention to provide a tool which may be used to remove a faucet handle and which may also be adapted to remove a drop-in cartridge so that only one tool is needed to perform both functions.

To accomplish these and other related objects of the invention, a tool is provided with a pair of elongated jaws. The jaws are hinged to a block which is also coupled with an extendable and retractable element. When the tool is to be utilized to pull a faucet handle, a shaft is coupled with the element and positioned within a hole in the top of the handle. The jaws are then coupled with a bottom edge of the handle and the element is extended in a manner so that the jaws exert an upward or outward force on the handle and effect its removal.

When the tool is to be utilized to remove a drop-in cartridge, the shaft is removed from the element and a claw or other gripping means is coupled with the element. The claw is then coupled with the cartridge and the jaws are positioned on a surface of the faucet body or housing. Retraction of the element then effects removal of the cartridge from the faucet housing.

BRIEF DESCRIPTION OF THE DRAWINGS

In the accompanying drawings in which like reference numerals are used to indicate like parts in the various views.

DESCRIPTION OF THE PREFERRED EMBODIMENTS

Figures 1, 2, 3, 4, 5:
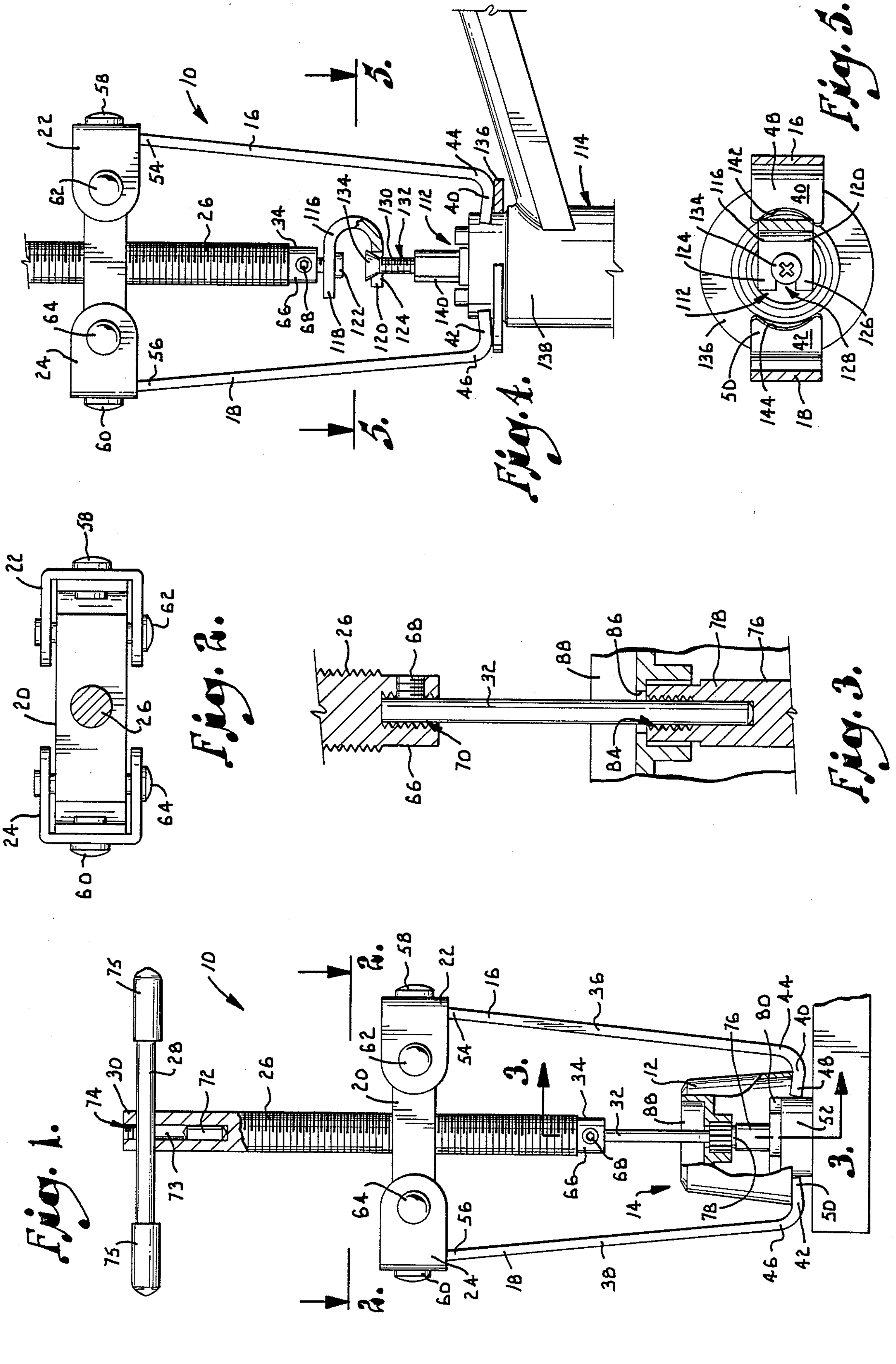
FIG. 1 is a front elevatinal view of the tool of the present invention coupled with a faucet handle and with portions broken away to reveal internal details.
FIG. 2 is a partly sectional view of the tool taken along line 2—2 of FIG. 1 in the direction of the arrows.
FIG. 3 is an enlarged fragmentary sectional view of the tool and faucet handle taken along line 3—3 of FIG. 1 in the direction of the arrows.
FIG. 4 is a front elevational view of the tool modified for removing a drop-in cartridge and with portions broken away for purposes of illustration.
FIG. 5 is a sectional view of the tool taken along line 5—5 of FIG. 4 in the direction of the arrows.

Referring now more specifically to the drawings and initially to FIGS. 1-3, a tool of the present invention is represented generally by the numeral 10. Tool 10 may be used for the removal of a handle 12 of a faucet 14 and comprises a pair of spaced apart jaws 16 and 18 which are coupled with a block 20 by U-shaped members 22 and 24. A bolt 26 which cooperates with the jaws 16 and 18 for removing handle 12 extends through and threadably engages block 20. A rod 28 for turning the bolt extends transversely through a first end 30 of bolt 26 and a shaft 32 is coupled with and extends coaxially from a second end 34 of the bolt.

Jaws 16 and 18 comprise elongated and generally flat extension legs 36 and 38 which have inwardly turned gripping portions 40 and 42 formed at bottom ends 44 and 46. Although the angular relationship may be varied, portions 40 and 42 preferrably extend at an angle of approximately 90° from legs 36 and 38. The inner edges 48 and 50 of the gripping portions may also include arcuate notches, as later described, for complementally engaging the cylindrical shape of cartridge housing 52.

Upper ends 54 and 56 of extension legs 36 and 38 are fixedly coupled with U-shaped members 22 and 24 by rivets 58 and 60. The U-shaped members are coupled with block 20 by pins 62 and 64 which allow the members to pivot about the longitudinal axis of the each pin. The block 20 and U-shaped members 22 and 24 are preferably sized such that when the tool is coupled with the faucet the distance between the upper ends 54 and 56 of extension legs 36 and 38 is greater than the distance between the bottom ends 44 and 46 of the legs.

A chuck 66 is formed at the lower end 34 of bolt 26 and includes a threaded set screw 68 which may be tightened to securely engage the shank 32 in an inner passageway 70 of the chuck. A shorter shank 72 is housed within a similar passageway 73 in the opposite end 30 of bolt 26. A set screw 74 is threaded into the end of the passageway 73 and removable rubber caps 75 on each end of the rod 28 allow the rod to be removed to provide access to shank 72.

Faucet 14 comprises handle 12 which is coupled with a screw-in flow control cartridge 76. Cartridge 76 comprises a body portion (not shown) and a stem 78 and is maintained within faucet housing 52 by a threaded retaining ring 80. Ring 80 is coupled with the cartridge but may be formed separately as with a drop-in cartridge. Stem 78 includes a central passageway 84 which is partially threaded for receiving a screw (not shown). The screw normally extends through a hole 86 in an upper recessed portion 88 of handle 12 and couples the handle with the cartridge stem 78.

When tool 10 is to be used to remove the handle 12 from faucet 14, the retaining screw which couples the handle with the faucet is first removed. The shaft 32 or 72 is then inserted into the chuck 66 and the set pin 68 tightened to secure the shaft in the chuck. The longer shaft 32 may be used on most faucets but the shorter shaft 72 may be required for faucets having a handles in which the distance from the bottom of the handle to the top is large. When the shorter shaft is needed, it may be removed from its housing in passageway 73 by removing the set screw 74 and rod 28.

After the appropriate shaft is coupled with chuck 66, it is then inserted into the passageway 84 of the cartridge stem 82. The bolt 26 is then adjusted to allow the inwardly turned gripping portions 40 and 42 of jaws 16 and 18 to slide under the handle 14 and engage the cartridge housing 52. The bolt is then extended by turning the rod 28 until the gripping portions engage the bottom edge of handle 14. Continued extension of the bolt causes the gripping portions to exert an upward force on the handle which results in removal of the handle from the faucet. When more leverage is needed to turn the bolt, the set screw 74 may be loosened and the rod 28 moved off center to provide a torque arm of greater length. The set screw may then be tightened to maintain the rod at the desired position.

In removing the handle 12, it is important that jaws 16 and 18 exert a resulting force in a direction substantially parallel to the axis along the length of the cartridge stem 80. Otherwise, the handle will bind on the stem and removal will be substantially more difficult and may result in damage to the handle or the cartridge. The opposed jaws 16 and 18 and centrally positioned shaft 32 provide this resultant vertical force by exerting equal upward forces on opposite sides of the handle.

The tool 10 is particularly advantageous in that the jaws 16 and 18 securely grip the bottom edge of the handle 12 to prevent the jaws from slipping outwardly when the bolt is tigthened. This feature is provided by spacing the upper ends 54 and 56 of extension legs 36 and 38 so that they are farther apart than the bottom ends 44 and 46 when coupled with the faucet. This ensures that gripping portions 40 and 42 are angled slightly upwardly toward their inner edges to prevent any slippage of the gripping portions when an upward force is applied to the handle. The hinged connection of the jaws to the block 20 also allows the tool to be easily adapted to handles of various sizes and allows for quick coupling of the tool with the handle.

Turning now to FIGS. 4–5, tool 10 is shown in a modified embodiment which may be used for removing a cartridge 112 from its housing within a faucet 114. Faucet 114 is a single handle faucet but tool 10 may be used with a range of other faucets.

Tool 10 has been modified by removing the shank 32 and inserting a U-shaped element 116 into the chuck 66. Element 116 comprises an upper portion 118 and a lower portion 120. A pin 122 extends through upper portion 118 and is secured to the tool by tightening set screw 68. Pin 122 is preferably formed of a hardened metal which is resistant to tensile forces. The pin may be fixedly secured to upper portion 118 or it may be coupled in a manner which allows U-shaped element 116 to swivel about the vertical axis of the pin.

The lower portion 120 of the U-shaped element functions as a claw and comprises a pair of spaced apart fingers 124 and 126 formed by a slot 128. The slot is sized to receive a shaft 130 of screw 132 but must also be sized smaller than screw head 134. The slot is also positioned so that the screw 132 is vertically aligned with the central axis of the bolt 26. Tool 10 may include a platform 136 to support jaws 16 and 18. Platform 136 comprises a washer sized to fit over the mouth of cartridge housing 138 although other supporting devices may be used.

When used to pull cartridge 112 from housing 138, the washer platform 136 is first placed over the housing. Screw 132 is then threaded into cartridge stem 140 and the U-shaped element is coupled with the catridge 112 by engaging screw head 134 between fingers 124 and 126. Jaws 16 and 18 are then supported on platform 136 and a vertically upward force is exerted upon the screw by retraction of the bolt 26. This upward force results in easy removal of cartridge 112 from housing 138.

In order to prevent binding of the cartridge as it is removed from the housing, it is important that the upward force be directed along a central axis of the cartridge stem 140. The U-shaped element 116 cooperates with the jaws 16 and 18 to ensure that the resulting upward force is directed along the central axis and prevents damage to the cartridge which might otherwise result from conventional removal methods. The support platform 136 also prevents the jaws 16 and 18 from contacting and damaging the faucet housing. The platform may also be used for this purpose on faucets such as faucet 14.

The flat gripping portions 40 and 42 also provide a stable support for the tool and prevent any rocking of the tool while the bolt is retracted. The inward inclination of the jaws 16 and 18 further prevents slippage of the gripping portions. Arcuate notches 142 and 144 at the inner edges 48 and 50 of the gripping portions closely engage the outer cartridge housing to provide additional stability.

The tool 10 may thus be equipped for removing handles from faucets and, with a quick modification, may also be used for removing the cartridge. In addition to its versatility, the tool exerts a resulting vertical force which allows for easy removal of the handle and cartridge without damage to either item.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. A tool for removing a faucet handle from the stem of a faucet and a flow control cartridge from within a housing in the faucet, said tool comprising:

a block having an internally threaded aperture;

a pair of spaced apart jaws having upper and lower ends, said jaws pivotally coupled at said upper ends with said block;

means for coupling said jaws with said faucet handle and supporting said jaws on said faucet, said means coupled with said lower ends of said jaws;

an elongated threaded member coupled with said aperture in said block and having upper and lower ends;

an axially extending inner passageway formed within the lower end of said threaded member;

a first element having a lower end sized for engaging said cartridge stem and having an upper end sized for placement within said pasageway;

a second element interchangeable with said first element and having an upper end sized for placement within said passageway and a claw-shaped lower end for coupling with said cartridge stem;

means for releasably securing the upper ends of said first and second elements within said passageway;

wherein said first and second elements may be extended and retracted when coupled with said elongated member by rotation thereof, and wherein said handle may be removed when said first element is coupled with said elongated threaded member by coupling said jaws with said handle and extending said first element to engage said cartridge stem and exert a resulting force on said handle parallel to a longitudinal axis of said elongated threaded member, wherein when said second element is interchanged with said first element said cartridge maybe removed by coupling the claw-shaped lower end with the cartridge stem, supporting said jaws on said faucet and retracting said second element to exert a resulting force on said cartridge parallel to said longitudinal axis.

2. The invention as set forth in claim 1, wherein said coupling and supporting means comprises an inwardly projecting gripping arm on each jaw.

3. The invention as set forth in claim 2, wherein each of said gripping arm includes an arcuate notch on an inner edge for complemental engagement with an outer surface of said cartridge housing.

4. The invention as set forth in claim 3, wherein each of said jaws further comprises an extension member coupled at a lower end with the gripping arm and at the upper end with said block and wherein each of said gripping arms extends at an angle of approximately 90° from the respective extension member.

5. The invention as set forth in claim 1, including a U-shaped member for coupling each jaw with the block to allow for a range of movement of each jaw.

6. The invention as set forth in claim 1, wherein said claw-shaped lower end of said second element extends generally transversely to said longitudinal axis of said elongated threaded member and includes a slot open at one end for coupling with said cartridge.

7. A tool for pulling a fluid control cartridge from a cartridge housing within a faucet, said tool comprising:

a block having an internally threaded aperture;

a pair of spaced apart jaws having upper and lower ends, said jaws pivotally coupled at said upper ends with said block;

inwardly projecting arms coupled with said lower ends of the jaws for supporting said jaws on the faucet;

an elongated threaded member coupled with said aperture in said block and having upper and lower ends;

a pulling element coupled at an upper end with said elongated threaded member having a claw-shaped lower end, wherein said pulling element may be extended and retracted by rotation of the elongated threaded member, wherein retraction of said pulling element after coupling with the cartridge and supporting the jaws on said faucet exerts a longitudinal resulting force on said cartridge to effect removal thereof.

* * * * *